Sept. 13, 1938.    G. B. POLLOCK    2,129,959
CAMERA
Original Filed May 31, 1935    2 Sheets-Sheet 1

INVENTOR.
Gordon B. Pollock
BY Joseph F. Westall
ATTORNEY.

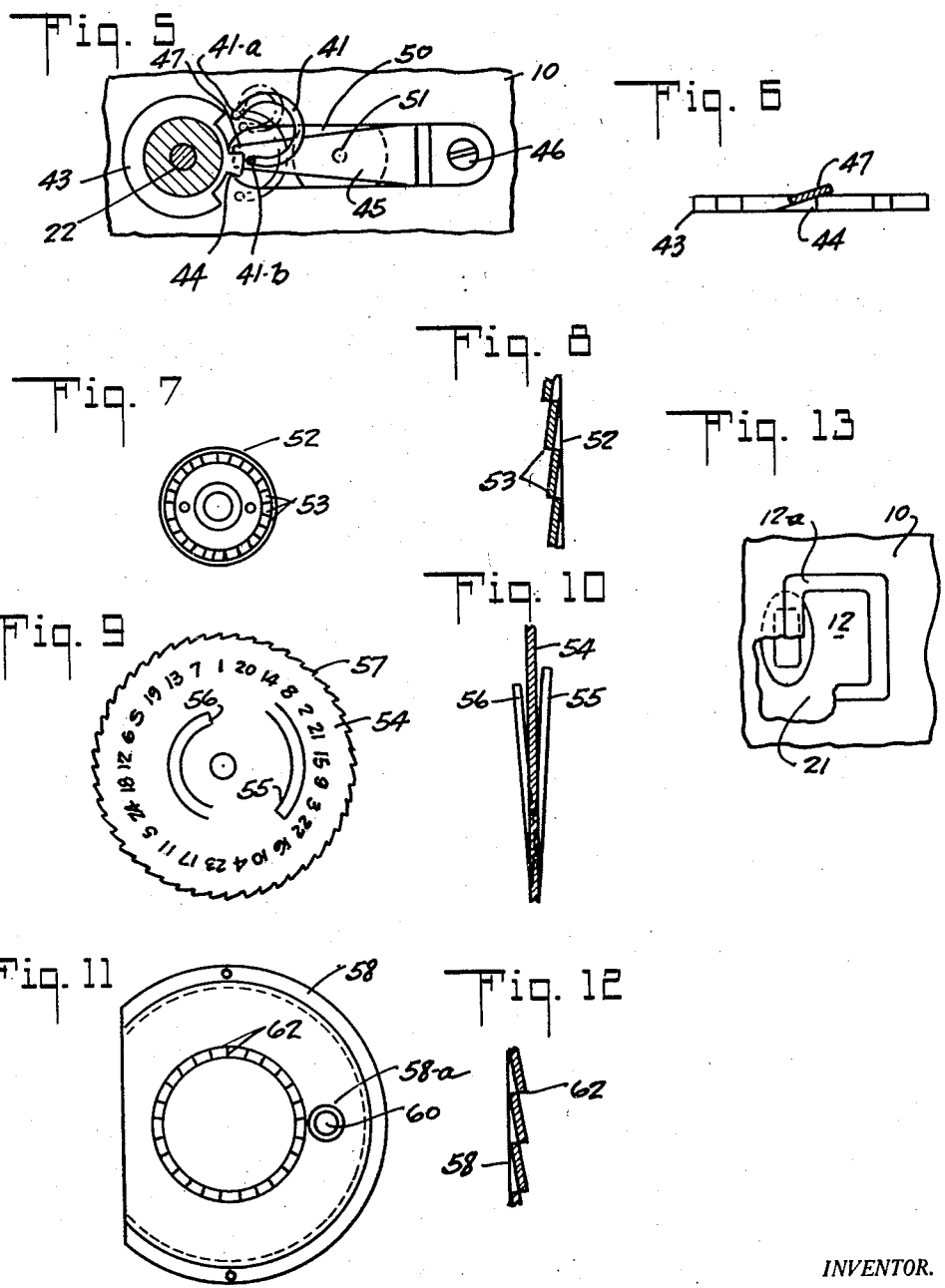

Patented Sept. 13, 1938

2,129,959

UNITED STATES PATENT OFFICE 2,129,959

CAMERA

Gordon B. Pollock, Los Angeles, Calif.

Application May 31, 1935, Serial No. 24,208
Renewed April 29, 1938

17 Claims. (Cl. 95—16)

This invention relates to a form of camera having a pivoted lens, and which is provided with means to confine light rays passing therethrough and to direct them to the surface of an arcuately disposed sensitized film, said means comprising a narrow tube, rectangular in cross-section throughout its length, extending, but widening vertically to width of the strip of film as it extends, from the lens mount to a slot-like area closely adjacent the front of said film; so that when the end of said tube adjacent said film is caused by spring means to swing on the lens mounting pivot in the arc of a circle from one end of its range of movement to the other, it will cause a narrow slit of exposure through said tube to pass over the film in a manner similar to that of a focal-plane shutter.

While the pivoted lens, as above generally referred to, is well known in the art and has been heretofore utilized in panoramic cameras, where an abnormally wide field is to be covered, said principle seems never to have been successfully employed in a camera intended for the making of normally-proportioned pictures, that is to say, for the production of pictures, the length of which is equal to or less than the focal length of the lens. It is specifically to such a camera that the present invention appertains.

As is well known, expense prohibits use in low-priced conventional forms of snap-shot cameras, where cost of manufacture is necessarily one of the principal considerations, of a lens of sufficient focal length to make a most pleasing perspective, as the cost of such lens, for use in such a camera, is, all other things being equal, dependent upon its focal length.

One of the outstanding advantages of the application, as hereinafter described, of the principle of the pivoted lens to the production of normally proportioned pictures in an ordinary snap-shot camera is that such construction permits use of a meniscus lens which costs no more to make in greater or lesser focal length so that such focal length as will result in the most pleasing perspective, may be adopted without increase in cost, at the same time having sufficient covering power to clearly depict detail over the entire picture.

In the present application of the principle above adverted to, the end of the tube is brought very close to the film as compared with the older form of camera using the pivoted lens construction, which change results in much greater shutter efficiency.

It is a principal object of the present invention to provide a camera in which a lens of comparatively low cost may be employed with superior results in a small snap-shot camera designed for taking normally proportioned pictures.

In achieving the results last-mentioned, it is a specific object to provide spring-tensioning means for the operation of the shutter in which there is greater tension at the beginning of the exposure of the film, but which gradually diminishes so as to avoid acceleration of shutter movement thus maintaining uniformity of the exposure of different areas of the sensitized surface; and by bringing the end of the exposure tube very close to the film, to utilize the cushioning effect of air-resistance as an additional means of assuring uniform speed.

Another important object is to provide means operated in synchronism with cocking of the shutter for disposition of an exposed portion of the film on its take-up spool and placing a section of unexposed film in position for a subsequent exposure, such means eliminating need of any form of self-capping arrangement on the cocking cycle, because the movement of the shutter tube to cocked position, carrying with it a section of raw film for the next picture, exposes only previously exposed film of the area of the end of the tube between successive exposure areas of the film.

To provide a form of camera of very light and compact construction, thus to permit use of Bakelite or other mouldable composition, of attractive appearance and low cost, are other important objects of the present contribution to the art.

Still other objects are simplicity of details of operative mechanism, elimination of parts, reliability of operation, convenience of manipulation in moving film, taking pictures, loading and unloading—all at comparatively low manufacturing cost.

Further objects and corresponding advantages will be apparent to all of skill in this art, upon a study of the accompanying drawings, in which—

Fig. 5 is a sectional view on line 5—5 of Fig. 2, showing details of light-tube shutter, spring tensioning, detent, and release means;

Fig. 6 is a detail view of part of the means shown in Fig. 5;

Figs. 7, 8, 9, 10, 11 and 12 illustrate, respectively, the principal elements of the exposure counting mechanism;

Fig. 13 is a detail cut-away elevation of the light aperture in the camera box, showing a portion of the lens pivoting member and its light aperture.

Figure 1:
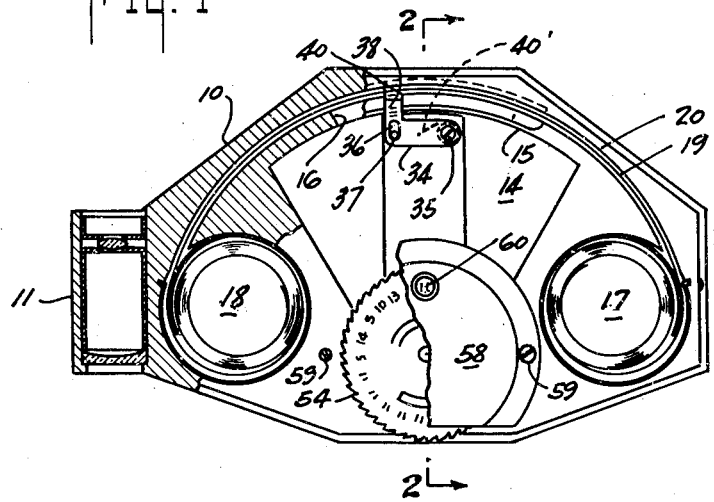
Fig. 1 is a view of the camera as a whole, partially in longitudinal section, but showing portions in elevation.

Referring to the drawings in detail in which like numerals indicate similar parts throughout the several views, a camera box 10 preferably of moldable material, such as Bakelite, has attached to it a view finder 11, the details of construction of which, being old in the art need not be further described, and is provided with a light aperture 12, details of form of which are most clearly shown in Fig. 13 of the drawings, 12a being the beveled edge of such aperture. Adjacent said light aperture the said camera box is bored out to form a chamber 13 in the form of a segment of a cylinder in which chamber is pivoted the lens-carrying means hereinafter described.

14 designates the shutter-tube operating chamber, roughly of segmental cylindrical form adjoining chamber 13. An arcuate partition 15 forming one of the walls of chamber 13 is provided with a rectangular aperture 16 through which light from the lens may be projected upon a section of film therein during exposure. 17 indicates a feedroll compartment, and 18, a film take-up compartment. Film 19 shown (Fig. 1) partially rolled in each of said film compartments, passes through an arcuate groove-guide 20 from the feed-roll compartment to the take-up roll compartment.

A cylindrical block 21 which, in the preferred form, is supported with a limited range of rotative movement by trunnions 22 and 23, turning in bearings 22a and 23a in opposite sides of the camera box, is provided with a radial bore 24 extending transversely through its center, which bore 24 is adapted to register at various stages of the limited rotative movement as hereinafter described, of cylindrical block 21, with light aperture 12 in the camera box and which bore 24 forms part of the conduit for light rays through the lens and beyond to the film.

Lens 25 is carried by lens-mount 26, which in turn, is rigidly secured in any suitable manner in bore 24, with the exit node of said lens substantially in axial alignment with trunnions 22 and 23 of said cylindrical block 21.

27 and 28 indicate, respectively, end walls, and 29 and 30, side walls of the light conduit tube-shutter 31, said end walls, respectively, having their outer surfaces parallel to each other and extending from and in the same plane as the ends of cylindrical block 21, while said side walls (joining at their appropriate edges, corresponding edges of said end walls, thus giving to conduits tube-shutter 31 its cross-sectional rectangular form) extend rearwardly from said lens-carrying member parallel with the axis of bore 24, each to a point closely adjacent partition 15.

Rear ends of walls 27 and 28 are arcuately formed so as to be parallel with the inner wall of said partition 15; while inner ends, respectively, of walls 29 and 30 are turned inwardly as indicated at 29a and 30a to provide light baffles to avoid or minimize the effects of reflections from the inner walls of the tube.

Counter-balances 32 and 33 are provided in opposite ends of block 21 for obvious purposes.

Lever 34 pivoted at 35 to end wall 27 of tube-shutter 31 (and which is limited in its range of movement on its pivot by engagement of the end of slot 36 in said lever with pin 37 attached to an adjoining portion of end wall 27) is provided with an angular extension 38 bent at 39, and having a finger 40 bevelled to a point, so as to engage an adjoining edge of the film in its groove-guide 20. Spring 40¹ normally urges said lever 34 to film-engaging position as illustrated most clearly in Fig. 1 of the drawings.

While it is contemplated that motion-picture film having sprocket holes in its margin may be used in the camera forming the subject-matter of this application, and that finger 40 will engage with such sprocket holes during the movement of said tube-conduit shutter to cocking position (the bevel of said finger 40 permitting it to slide over said sprocket holes without engagement during an exposure cycle) it will be understood that the construction illustrated in the drawings herein and above described may be designed for use with film without sprocket holes, the point of finger 40 in such case biting into the film on the cocking cycle of the tube-shutter. To actuate the tube-conduit shutter, a tension spring 41 is provided, which is attached at one end 41a to the camera box and at the other end 41b to cylindrical block 21, said spring being so attached and tensioned as to tend normally to urge rotation of said block 21 with its appended tube-shutter 31 through its exposure cycle. Knob 42, rigidly secured in any suitable manner to the outer end of trunnion 22, permits manual cocking rotation of cylindrical block 21 and its attached tube-conduit shutter.

Detent means for releasably holding said tube-shutter 31 in cocked position consists of a disk 43 peripherally cut-away to leave a radially extending tooth 44 (Fig. 5), which tooth is bent or bevelled (Fig. 6) so as to provide an inclined plane for the purpose hereinafter more fully described, is rigidly secured to trunnion 22 so as to rotate therewith. Leaf-spring 45, attached at one end, by any suitable means, such as by screw 46, to the inner side wall of the camera box is cut at its opposite unattached end 47, and is slightly twisted to form a narrow inclined plane adapted to be releasably engaged with tooth 44 on disk 43, so that when cylindrical block 21, with its tube-shutter is moved to cocked position, the inclined plane on said tooth 44 will frictionally pass beneath end 47 of spring 45 which spring will immediately snap back of the opposite edge of tooth 44, thus holding the tube-shutter in cocked position.

Figure 2:
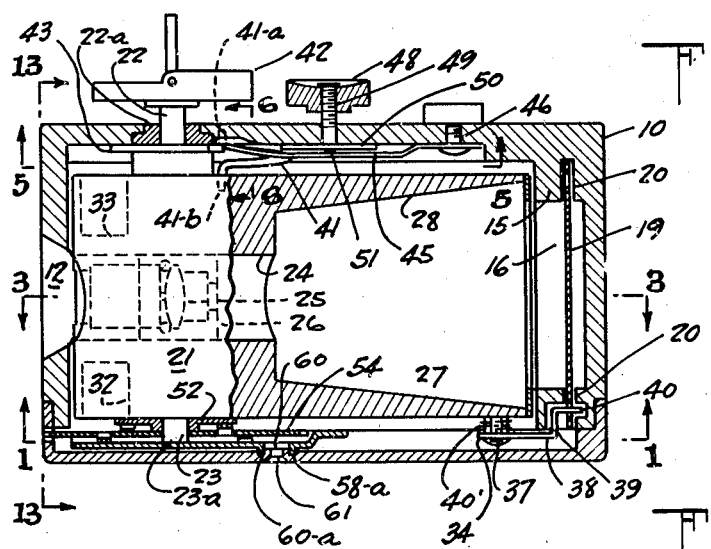
Fig. 2 is a sectional and elevation view on line 2—2 of Fig. 1.
Figure 4:
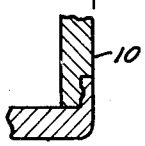
Fig. 4 is a sectional view showing means whereby the cover of the camera box is held frictionally in its closed position.

To release the shutter, thus permitting its actuation during an exposure cycle, release button 48, (Fig. 2) is provided with a shank 49 which extends through the side wall of the camera box, and which at its inner end is riveted or otherwise suitably secured to a plate 50, which in turn is so disposed as to contact with boss 51 pressed intermediate its end into spring 44. Manual pressure on said release button will raise end 47 of spring 45 and permit the pivoted lens with its appended tube-conduit shutter to respond to the urge of its tension-spring and move in its exposure cycle.

Rigidly secured in any suitable manner with relation to trunnion 23 is a crown tooth ratchet wheel 52 (Fig. 7) provided with a series of teeth 53 (Fig. 8). Loosely mounted on trunnion 23, so as to engage the teeth of ratchet wheel 52 is a counter disk 54 carrying indicating numerals from 1 to 24 to correspond with the number of exposures of a like numbered exposure film, said numerals being arranged as shown in Fig. 9, where every fourth number is shown as consecutive. Counter disk 54, preferably made of thin brass, has arcuately cut in its surface a spring pawl 55, necessarily attached at one end as part of said disk, but being bent inwardly at its free end as shown most clearly in Fig. 10 so as to be adapted to engage teeth 53 on ratchet wheel 52.

A similar spring pawl 56 also in like manner cut from counter disk 54 is formed (Fig. 10) on the opposite side of said counter-disk 54 for purposes shortly to be described.

Counter disk 54 is provided with peripheral teeth 57 for manual setting.

Figure 3:
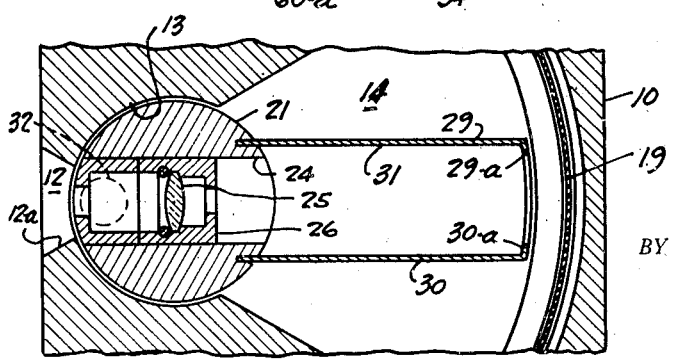
Fig. 3 represents a section through the lens, its mounting, and its pivotal supporting means, on line 3—3 of Fig. 2.

A housing or cover 58 for said counter-disk 54 is secured in any suitable manner as by screws 59 (Fig. 1) to portions of partitions of the camera box. Aperture 60 in said cover 58 is so disposed as to register with the numerals carried by the counter disk and to also register with a corresponding aperture 61 (Fig. 3) in the side wall cover plate of the camera box. A light trap between cover plate 58 and said camera cover is formed by providing an annular flange 58a (Figs. 1 and 2) around aperture 60, adapted to snugly fit a corresponding annular groove 60a in the inside of the camera box cover plate. Cover plate 58 is provided on its inner face with a series of ratchet teeth 62, the arrangement of which is shown in enlarged detail in Fig. 12, said teeth being adapted to be engaged by spring pawl 56 permitting movement only in an operative direction.

In operation the camera being loaded and the film, being threaded through groove-guide 20 to a point of engagement with finger 40 of the film-moving mechanism, the counter being manually set by manipulation of the peripheral teeth of counter-disk 54 to the numeral for the first exposure, the light-tube shutter being in uncocked position, the outside plate cover of the camera box is then secured in place. Next, the shutter is cocked by turning the shutter-control knob 42, such manipulation advancing the film to position for the first exposure, which is made by pressing the shutter-release button 48, thus permitting the pivoted lens with its appended light-conduit tube shutter, under the urge of its tension spring, to pass over the film, when the instrument is ready for the next cocking cycle.

The counter will be manually set at 1 to indicate the first section of film to be exposed, and after being so set will be rotated in response to a cocking cycle of the shutter to expose the next consecutive numeral.

It will be obvious that the specific arrangement of numerals, shown particularly in Fig. 9, is subject to numerous variations in the consecutive arrangement, the principle being that the number of degrees of movement of the counting disk shall not be equally divided into 360 degrees.

In the claims, I refer in several instances to the "cycle of movement" of the optical system, including the shutter. Such cycle is to be considered as the movement of said optical system resulting from the act of setting and that of releasing the exposure means.

What I claim and desire to cover by Letters Patent is,—

1. In a camera, a box, a pivoted tube-shutter within said box, spring tensioning means for operating said tube-shutter consisting of an arcuate expansion-spring having its opposite ends pivoted to said box and tube-shutter respectively so that at the beginning of its operative expansion its force is applied in a direction tangent to the arc of a circle representing the operative movement of the shutter, but which will, as such expansion proceeds, gradually change its line of force so as to be applied on a chord of said arc, thus counteracting tendency of acceleration of movement of said shutter after initial inertia is overcome.

2. In a camera of the character described, a segmental cylindrical shutter-operating compartment having a curved wall and two parallel walls, a tube-shutter pivoted in said compartment having two parallel surfaces, the swinging end of said tube-shutter terminating closely adjacent to the curved wall of said compartment the parallel surfaces of said tube-shutter being adapted to swing closely adjacent the parallel walls of said shutter-operating compartment, thus to utilize the cushioning effect of air imprisoned in said shutter-operating compartment in the path of said moving shutter element, to equalize stages of shutter-operating movement.

3. In a camera of the character described, shutter tensioning, detent, and release means comprising a trunnion pivot, a disk rigidly secured to said trunnion pivot, a lens and tube-shutter carried by said disk, said disk having a radially disposed tooth, said tooth being inclined at an angle to the plane of the surface of said disk, a spring normally urging rotation of said pivot carrying said disk, a leaf spring extending in the same plane radially from said disk and being secured at its end furtherest from said disk in fixed relation thereto, the free end of said leaf spring overlapping the outer periphery of said tooth, said free end of said spring being also inclined relative to the plane of said disk to engage the corresponding angle of said tooth, a boss intermediate the ends of said leaf-spring, and a button having a shank-extension fixed with relation to the point of pivoting of said leaf spring, but having a limited range of longitudinal movement, adapted to contact with said boss to move said leaf-spring vertically with respect to the plane of said disk.

4. In a camera of the character described, a housing, a tube-shutter pivoted in said housing having a light aperture therein, spring means to actuate said shutter in its arc of operative movement, the outer walls of said shutter being curved at the end thereof in which said light aperture is formed, and the walls of said housing adjacent the light aperture being curved parallel to said shutter walls to close said light aperture during location of said shutter at the opposite ends of its operative movement.

5. In a camera of the character described, a housing, a tube-shutter journalled in said housing having film-moving means comprising a spring-actuated finger attached to the swinging end of the tube-shutter and adapted to engage an edge of the film on the cocking cycle of said shutter to carry said film in synchronism with the cocking movement of said shutter, and to disengage said film during the exposure cycle.

6. In a camera, a box, a focal plane shutter pivoted within said box and provided with actuating means comprising an arcuate spring having its ends pivoted to said box and said shutter respectively at points thereon spaced substantially equidistantly from the axis of arcuate movement of said shutter.

7. A camera comprising a housing, a lens adapted to be moved during an exposure so as to focus central rays at more than one point, means operable synchronously with a movement of the lens to move the film during a part of its cycle of movement in such a manner that the portion of the film adjacent to the exposing end of the shutter remains in unmoved relationship therewith.

8. A camera comprising a housing, an optical system associated with said housing adapted to move relative to said housing, said optical system being also adapted to move synchronously with a strip of film, adapted to be carried by said housing, during a portion of its cycle of movement.

9. In a camera of the character described a tube-like focal plane shutter adapted to move synchronously with the film during part of its cycle of movement.

10. A camera comprising a housing adapted to carry a section of film, an inclosing chamber formed by said housing, a tube-like focal plane shutter, one end thereof being provided with an exposing orifice, the other end conforming to portions of said enclosing chamber, so as to exclude extraneous light from said housing, and means for moving film synchronously with a portion of the shutter cycle of movement.

11. In a camera, a housing, a focal plane shutter journalled within said housing and provided with actuating means comprising a spring attached to the housing adjacent said shutter and also attached to said shutter so that the tension of said spring will be applied in the direction of operative movement at the beginning of an exposure cycle, but which will, as said cycle proceeds, gradually change its line of force tangentially as to said original line, so as to exert less actuating force as the movement continues, thus counteracting the tendency of acceleration of movement of said shutter after initial inertia is overcome.

12. In a camera, a housing, a shutter, means to pivot said shutter in said housing, spring tensioning means for operating the shutter, said means consisting of a spring positioned so that at the beginning of its operative movement its force will be applied in a direction substantially tangent to the arc of a circle representing the operative movement of the shutter but which will, as such force is expended, gradually change its direction of urge so as to be applied on a chord of said arc, thus counteracting tendency of acceleration of movement of said shutter after initial inertia is overcome.

13. In a camera, a housing having a shutter therein, means to pivot said shutter in said housing, a spring having one of its ends connected to said housing and its other end connected to said shutter whereby the urge of said spring at the beginning of arcuate movement of said shutter is directed substantially tangentially to the arc of movement of the shutter.

14. In a camera, a shutter, a housing for said shutter, means to pivotally support said shutter within said housing, an arcuate spring having its ends connected to said housing and shutter respectively with a radius of the arc of movement of said shutter substantially bisecting the arc of said spring.

15. In a camera, a housing, a shutter within said housing, a trunnion for the arcuately movable support of said shutter within said housing, an arcuate spring having its ends connected to said housing and said shutter respectively at points thereon located in an arc having its center on the axis of said trunnion.

16. In a camera of the character described, shutter tensioning, detent, and release means comprising a trunnion pivot, a disk rigidly secured to said trunnion pivot, a lens and tube-shutter carried by said disk, said disk having a radially disposed tooth, said tooth being inclined at an angle to the plane of the surface of said disk, a spring normally urging rotation of said pivot carrying said disk, a leaf spring extending in the same plane radially from said disk and being secured at its end furtherest from said disk in fixed relation thereto, the free end of said leaf spring overlapping the outer periphery of said tooth, said free end of said spring being also inclined relative to the plane of said disk to engage the overlapped portion of said tooth.

17. In a device of the character described, a camera housing, a tube-shutter, means to pivot said tube-shutter within its said housing, said housing and tube-shutter having light apertures therein, and means to move the light apertures of said tube-shutter and housing respectively into and out of registry by movement of said tube-shutter.

GORDON B. POLLOCK.